United States Patent

Currell et al.

[11] 3,862,289
[45] Jan. 21, 1975

[54] METHOD OF FORMING A MOTOR CONTROL ROTOR ELEMENT

[75] Inventors: Richard W. Currell, Santa Clara; Louis Olah; Charles A. Vogel, both of San Jose, all of Calif.

[73] Assignee: Newell Industries Inc., Sunnyvale, Calif.

[22] Filed: Mar. 20, 1974

[21] Appl. No.: 452,729

Related U.S. Application Data

[62] Division of Ser. No. 336,616, Feb. 28, 1973, abandoned.

[52] U.S. Cl................... 264/272, 29/527.1, 29/598, 264/275, 310/43, 310/268, 318/313
[51] Int. Cl.............................................. B29d 3/00
[58] Field of Search .......... 29/598, 527.1; 310/268, 310/43; 318/313; 326–328; 264/272, 275

[56] References Cited
UNITED STATES PATENTS

| | | |
|---|---|---|
| 1,918,050 | 7/1933 | Mattern.......................... 264/275 X |
| 3,231,807 | 1/1966 | Willis................................. 318/313 |

*Primary Examiner*—Carl E. Hall
*Attorney, Agent, or Firm*—Flehr, Hohbach, Test, Albritton & Herbert

[57] ABSTRACT

For controlling the speed of a motor, a motor is provided with a rotor assembly characterized by a series of discrete detectable indicia carried by and distributed around the rotor element together with means disposed adjacent the path of the indicia for sensing the rate of movement of the indicia. In manufacturing a rotor element of the kind disclosed a cylindrical comb of axially protruding teeth is disposed to locate the teeth adjacent radially outwardly extending fingers of the rotor element. Subsequent thereto a coating of hardenable material is spread along the comb flanking both sides thereof whereby after the material hardens the comb can be removed from the rotor element to leave a circular track of spaced openings in the radially outer edge margin of the rotor element.

1 Claim, 8 Drawing Figures

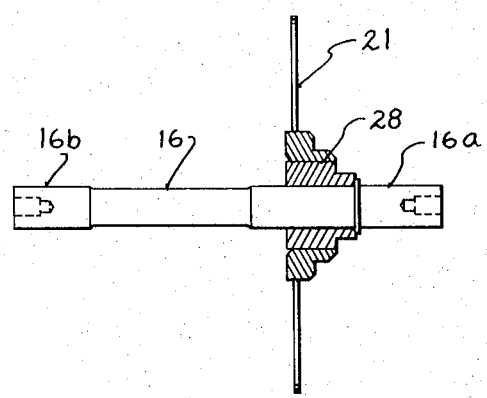
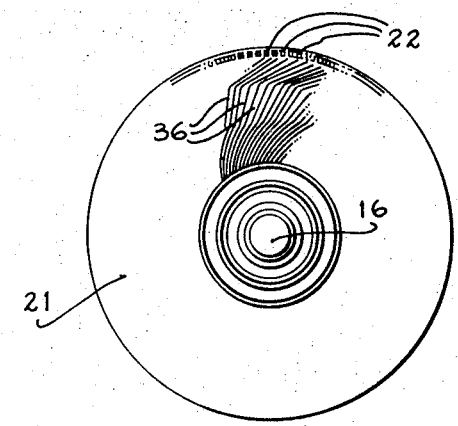
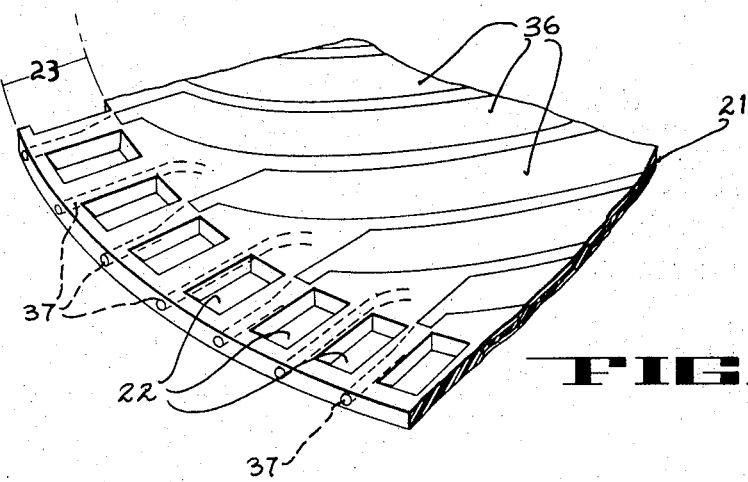
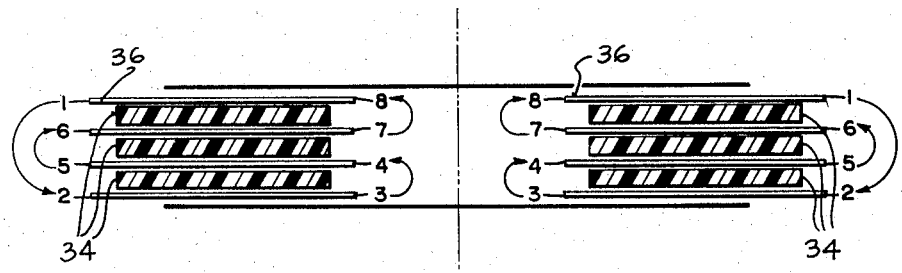

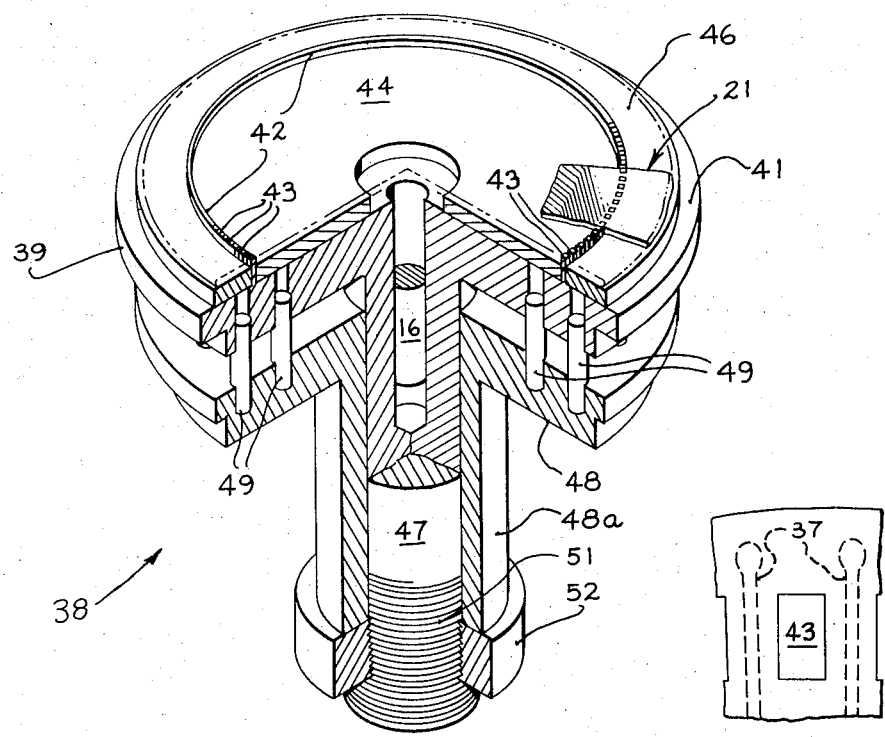
FIG_6
FIG_7
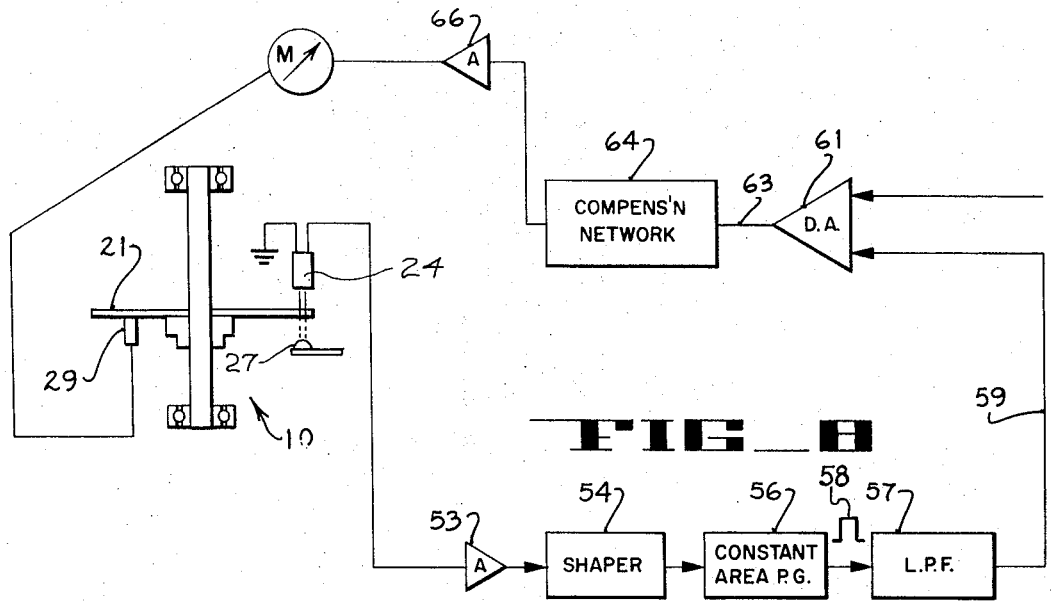
FIG_8

3,862,289

METHOD OF FORMING A MOTOR CONTROL ROTOR ELEMENT

This is a division, of application Ser. No. 336,616 filed Feb. 28, 1973 now abandoned.

BACKGROUND OF THE INVENTION

This invention pertains to a motor control assembly, system and method and means of manufacturing same.

In various known activities it is substantially essential that the speed of a drive motor be constantly monitored and controlled. The present invention is particularly useful in providing a constant monitoring and adjustment of the speed of a drive motor for use, for example, in driving the capstan of a tape recorder where the constant speed of the tape movement is relatively essential. Accordingly, there has been observed to be a need for a more accurate means for determining the actual speed of a drive motor for a tape drive capstan of the kind described in the above identified application.

SUMMARY OF THE INVENTION AND OBJECTS

In general, in a motor assembly there has been provided herein a motor housing, means forming a flux field within the housing and a novel rotor assembly for rotation within the field. The rotor assembly comprises a shaft for rotation within the housing, an annular rotor element carried by the shaft and means forming a series of discrete detectable indicia carried by and distributed around the rotor element. Means for sensing the indicia to provide a control signal representative of the rate of movement of the indicia have also been provided adjacent the path of the indicia. In addition to the novel motor assembly there has also been provided herein a novel method and means for forming the rotor element in a manner to provide uniformly spaced discrete indicia around the peripheral edge margin of the relatively flat rotor element.

In general, it is an object of the present invention to provide an improved motor assembly and method and means for manufacture of same.

Another object of the invention is to provide an improved system for monitoring the rate of rotation of a rotor.

The foregoing and other objects of the invention will become more readily evident from the following detailed description of the preferred embodiment when considered in conjunction with the accompanying drawings.

BRIEF DESCRIPTION OF THE DRAWINGS

FIG. 2 shows a diagrammatic plan view of a rotor element as employed in the structure of FIG. 1;

FIG. 3 shows a side elevation section view of FIG. 2;

FIG. 4 shows an enlarged perspective, diagrammatic view of a portion of the rotor element shown in FIG. 2;

FIG. 5 shows a diagram in side elevation section indicating the manner of interconnecting conductors therein;

FIG. 6 shows a perspective view with a quarter section removed of an improved jig for manufacture of the rotor construction disclosed in FIGS. 2 and 4;

FIG. 7 shows an enlarged detail view of a marginal portion of FIG. 2;

FIG. 8 shows a circuit diagram for controlling a motor assembly according to the invention.

DETAILED DESCRIPTION OF A PREFERRED EMBODIMENT

Figure 1:
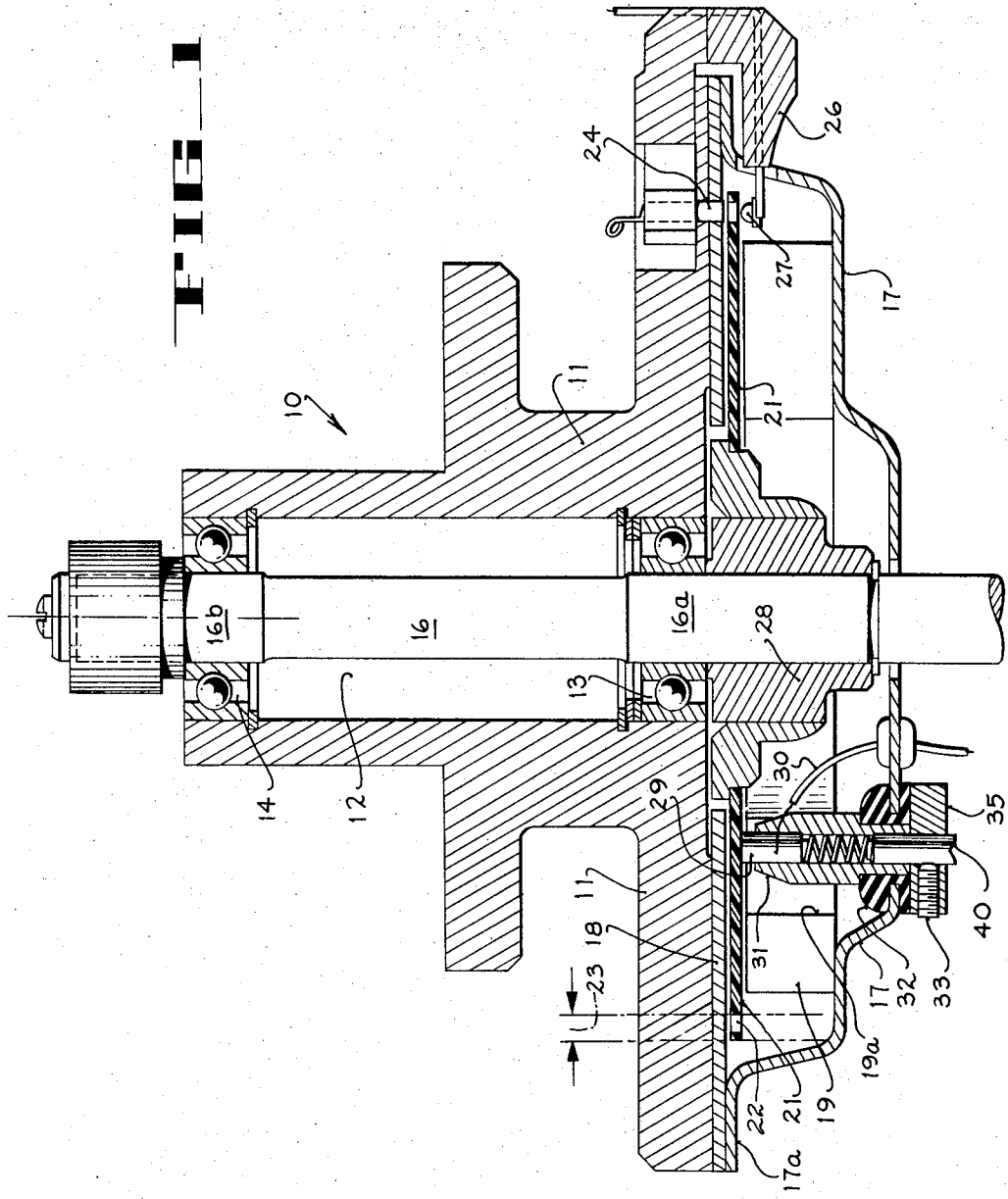
FIG. 1 shows a side elevation centerline section view of a motor assembly according to the invention.

Motor assembly 10 includes a motor body 11 formed with a hollow bearing housing 12 defined at each end by ball bearings 13, 14. The inner race of each of the two ball bearings 13, 14 is secured to a slightly enlarged mounting portion 16a, 16b of the motor drive shaft 16.

Motor assembly 10 includes a housing comprised of a lower body shell 17 formed with a radially outwardly extending flange portion 17a secured to body 11 with a spacer 18 interposed therebetween.

Means for providing a flux field comprises the annular magnetic ring 19 formed as a periodic pole or periodically focused magnet of a known style having a number of north/south poles distributed evenly about its peripheral edge margin.

An annular rotor element 21 is carried by a shaft 16 and includes a series of discrete detectable indicia disposed and distributed around its peripheral edge margin.

Briefly, as will be described in detail more fully below, a series of equally spaced light transmissive segments in the form of openings 22 are disposed in the radially outer edge margin 23 of rotor element 21.

Means for sensing openings 22 for providing a control signal representative of the rate of movement of openings 22 and hence rotor element 21 comprises a photo-transistor 24 or other photo-responsive element disposed in a mounting block 26 which incorporates a light source 27 disposed on a common axis with photo-transistor 24 with the path of openings 22 lying therebetween.

The material adjacent each of openings 22 is opaque so as to prevent light from passing therethrough and, accordingly, only the light passing through openings 22 registers upon the photo-responsive element 24. A hub 28 secured to shaft 16 serves to carry rotor element 21 for rotation when the motor is energized. Accordingly, a pair of brushes, such as the brush 29, is disposed to ride against the conductive surface as will be further explained below, of rotor element 21. Brushes 29 (one of which is shown) are supported by means of the hollow post 31 secured to body shell 17 by means of a rubber grommet 32 disposed in an opening through shell 17. A plunger 40 is adjustably held by screw 33 within block 35 to support brush 29 riding upon a coil spring. Brush 20 is electrically connected via lead 30. Ring magnet 19 includes recessed portions 19a for receiving the upper end of post 31 and brushes 29.

While not shown, it is to be understood that a second brush assembly of the type disclosed above is disposed at a substantially different radial location from the one shown.

Rotor element 21 is constructed with three layers of insulating material 34 prepared with a continuous conductor, for example, as by means of printed circuit techniques so as to form a continuous winding among the layers 34. At the inner and outer circumference of layers 34 the continuous conductor 36 extends radially inwardly and outwardly of element 21. These radially extending ends of conductor 36 are welded together in a manner whereby to form a continuous winding throughout element 21 in known manner thereby leaving the outer periphery formed with a series of fingers 37.

A series of equally spaced light transmissive openings or windows 22 can now be uniformly applied to the radially outer edge margin 23 of rotor element 21.

A jig 38 for applying a track of discrete openings in the peripheral margin of rotor element 21 comprises an annular rigid base member 39 having a support face 41 adapted to receive coaxially thereon a rotor element 21 of a type having radially outwardly protruding fingers, such as the fingers 37 of rotor element 21.

A cylindrically disposed comb 42 is carried coaxially of face 41 and formed with uniformly spaced teeth 43 protruding axially away from face 41. The inner diameter of comb 42 corresponds substantially to the diameter of rotor element 21 with the radially outwardly protruding fingers 37 thereof disposed between pairs of adjacent teeth 43. Inner and outer rigid annular removable rotor releasing members 44, 46 are disposed in flanking positions to comb 42 and in a plane lying between rotor element 21 and face 41. Means for engaging the two rotor removing members 44, 46 and for urging them axially of base membeer 39 so as to carry the rotor element therewith from comb 42 includes a rigid support post 47 extending coaxially behind face 41 and base member 39 and a driving head member 48 carried on post 47 for movement between retracted and advanced positions.

A plurality of rigid pins 49 are movable into and out of the plane of face 41 for engaging simultaneously both of members 44, 46 and thereby to lift rotor element 21 off of comb 42.

The foregoing movement of driving head 48 can be a pounding movement whereby the sleeve portion 48a of the driving head 48 is simply moved quickly along post 47. In other instances, however, it may be desirable to more smoothly apply the releasing forces to rotor 21 and for this purpose threads 51 are formed along a portion of post 47. A nut 52 is carried by threads 51 and engages the lower end of head member 48 for gradually advancing pins 49 into engagement with the removable members 44, 46.

In the method of forming a rotor element 21 with a radially outer edge margin containing a continuous track of discrete openings uniformly spaced circumferentially about the rotor element it is preferable to start with a relatively thin flat layered rotor construction of the kind described above having radially outwardly protruding conductive fingers each forming a connection between conductors on opposite sides of the element. The steps are then carried out of disposing the teeth 43 of annular comb 42 between adjacent fingers 37, the width of the teeth of comb 42 when disposed between fingers 37 serving to leave an interstice therearound. A hardenable non-conductive opaque material such as epoxy resin precursor is then applied into the interstices and then the material is permitted to harden. Thereafter the rotor element is removed from teeth 43 so as to leave openings 22 which are relatively sharply formed in the radially outer edge margin 23 of rotor element 21.

The placement of fingers 37 between teeth 43 serve to straighten any bent fingers so as to insure that all windows or openings 22 will be uniformly spaced.

Having thus formed the outer edge margin of rotor element 21, it is then utilized in the motor assembly 10 which is, in turn, preferably incorporated into the system now to be described.

Motor assembly 10 includes the phototransistor 24, the output signal of which is amplified by means of the amplifier 53. The output of amplifier 53 is fed to a suitable shaping circuit 54 and then via a constant area pulse generator 56 whose output 58 is a constant area pulse to a low pass filter network 57 wherein the low pass filter integrates the constant area pulses to provide a voltage level representative of the actual speed of rotation of rotor element 21. This voltage level is represented by the signal carried on the output line 59 of intergrating circuit 57.

Signal 59 represents one of two control signals to be fed to a differential amplifier 61 whereby the difference between the signal 59 and another control signal representing the desired speed of rotor element 21 serves to provide an amplified difference signal on output line 63 to a compensating network 64 of conventional type which serves to keep the entire loop stable in order to avoid oscillation in the correction being made to the speed of rotation of rotor element 21. The output from compensation network 64 is then fed to a power amplifier 66 which, in turn, is directed to the brushes of motor assembly 10 for varying the current thereto in an appropriate direction in order to minimize the difference signal generated by differential amplifier 61.

From the foregoing, it will be readily evident that there is provided an improved motor assembly, system and method and means for manufacturing the rotor element.

I claim:

1. The method of forming a rotor element with a radially outer edge margin containing a continuous track of discrete openings uniformly spaced circumferentially about the rotor element and starting with a relatively thin, flat layered rotor construction having radially outwardly protruding conductive fingers each forming a connection between conductors on opposite sides of said element, comprising the steps of disposing the teeth of an annular comb element between adjacent ones of said fingers, the width of the teeth of said comb when disposed between said fingers leaving an interstice therearound, applying a hardenable, non-conductive opaque material into said interstices, permitting said material to harden, and removing said rotor element from said teeth to leave openings formed in the radially outer edge margin.

* * * * *